United States Patent
Kagabu et al.

(10) Patent No.: US 9,194,994 B2
(45) Date of Patent: Nov. 24, 2015

(54) LIQUID CRYSTAL DISPLAY DEVICE

(71) Applicant: Japan Display Inc., Tokyo (JP)

(72) Inventors: Ken Kagabu, Tokyo (JP); Yasuhisa Shiraishi, Tokyo (JP); Yoshikazu Tanabe, Tokyo (JP); Yoshihiro Nishimine, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 14/147,736

(22) Filed: Jan. 6, 2014

(65) Prior Publication Data

US 2014/0192293 A1    Jul. 10, 2014

(30) Foreign Application Priority Data

Jan. 10, 2013   (JP) ................... 2013-002786

(51) Int. Cl.
*G02F 1/1335* (2006.01)
*F21V 8/00* (2006.01)

(52) U.S. Cl.
CPC ............ *G02B 6/0038* (2013.01); *G02B 6/0043* (2013.01); *G02B 6/0055* (2013.01); *G02B 6/0016* (2013.01)

(58) Field of Classification Search
None
See application file for complete search history.

(56) References Cited

U.S. PATENT DOCUMENTS

| | | | | |
|---|---|---|---|---|
| 5,584,556 A | * | 12/1996 | Yokoyama et al. | 362/625 |
| 2008/0043171 A1 | * | 2/2008 | Takahashi et al. | 349/65 |
| 2009/0040789 A1 | * | 2/2009 | Maeda et al. | 362/625 |
| 2009/0284688 A1 | | 11/2009 | Shiraishi et al. | |
| 2010/0182535 A1 | * | 7/2010 | Mifune et al. | 349/62 |
| 2011/0032727 A1 | * | 2/2011 | Kinder et al. | 362/606 |

FOREIGN PATENT DOCUMENTS

JP    2009-276531    11/2009

\* cited by examiner

*Primary Examiner* — Wen-Ying P Chen
(74) *Attorney, Agent, or Firm* — Lowe Hauptman & Ham, LLP

(57) ABSTRACT

A liquid crystal display device includes: a light guide plate including a front surface, a back surface and an edge surface, the light guide plate being arranged such that the edge surface faces a light source, the light guide plate internally reflecting light incident from the edge surface and causing surface emission from the front surface; a liquid crystal display panel; and a reflective sheet arranged so as to face the back surface of the light guide plate. The back surface includes a first portion and a second portion. A surface of the second portion is located at a position recessed relatively from a surface of the first portion. The surface of the first portion is a rough surface. The surface of the second portion is a smooth surface. The reflective sheet is in contact with the first portion but avoids contact with the second portion.

11 Claims, 2 Drawing Sheets

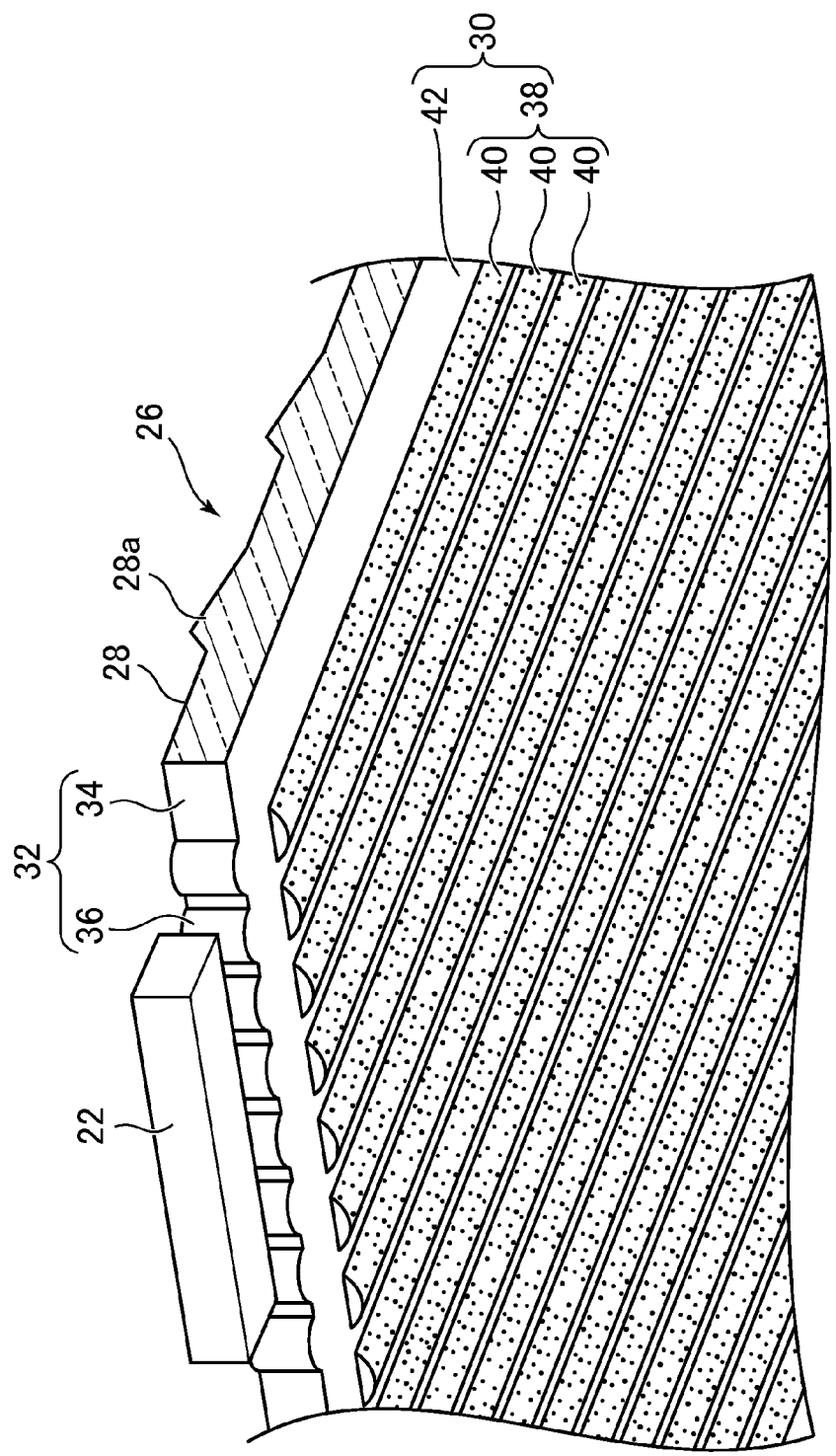

LIQUID CRYSTAL DISPLAY DEVICE

CROSS-REFERENCE TO RELATED APPLICATION

The present application claims priority from Japanese application JP2013-2786 filed on Jan. 10, 2013, the content of which is hereby incorporated by reference into this application.

BACKGROUND OF THE INVENTION

1. Field of the Invention

The present invention relates to a liquid crystal display device.

2. Description of the Related Art

In liquid crystal display devices including a sidelight-type backlight, light incident on the edge surface of a light guide plate is reflected at an interface on the back surface side, returns therefrom, and exits from the front surface (JP 2009-276531 A). Specifically, peak-shaped convex portions or valley-shaped concave portions are formed on the back surface side such that the ridge line extends in a direction orthogonal to a traveling direction of the light, and the light reflected by the convex portions or the concave portions exits from the front surface. Light traveling through the light guide plate includes, in addition to the light reflected at the interface on the back surface side, light passing through the back surface. For returning the passing light to the light guide plate, a reflective sheet is arranged.

In recent years, a reflective sheet having a high reflectance is sometimes used, which causes a problem that the light that should be reflected at the interface on the back surface of the light guide plate is absorbed by the reflective sheet because the reflective sheet is in close contact with the light guide plate. Moreover, the reflective sheet that is in close contact with the light guide plate expands with the thermal expansion of the light guide plate. However, when the light guide plate contracts, there arises a problem that the reflective sheet does not return to its original state and suffers from waviness.

As measures against these problems, it is conceivable to render the back surface of the light guide plate rough to thereby reduce its adhesion to the reflective sheet. However, the fine shape of irregularities constituting the rough surface is likely to reflect light at a short wavelength. Therefore, a phenomenon occurs in which blue light at a short wavelength first exits at a place close to a light source, and yellow or orange light at a long wavelength exits later at a place distant from the light source. Especially in a thin light guide plate or a large light guide plate, a difference in chromaticity is increased between the place close to the light source and the place distant therefrom. Moreover, most of light exits before reaching the place distant from the light source. Therefore, a difference in luminance also occurs in which a luminance at the place close to the light source is high and a luminance at the place distant from the light source is low.

SUMMARY OF THE INVENTION

It is an object of the invention to prevent close contact between a light guide plate and a reflective sheet to reduce a difference in chromaticity or a difference in luminance.

(1) A liquid crystal display device according to an aspect of the invention includes: a light source; a light guide plate including a front surface, a back surface on the side opposite to the front surface, and an edge surface connecting the front surface with the back surface, the light guide plate being arranged such that the edge surface faces the light source, the light guide plate internally reflecting light incident from the edge surface and causing surface emission from the front surface; a liquid crystal display panel arranged so as to face the front surface of the light guide plate; and a reflective sheet arranged so as to face the back surface of the light guide plate, wherein the back surface includes a first portion and a second portion, the second portion having a surface located at a position recessed relatively from a surface of the first portion, the surface of the first portion is a rough surface, the surface of the second portion is a smooth surface, and the reflective sheet is in contact with the first portion but avoids contact with the second portion. According to the aspect of the invention, since the surface of the first portion with which the reflective sheet is in contact is a rough surface, close contact between the light guide plate and the reflective sheet can be prevented to reduce a difference in chromaticity or a difference in luminance.

(2) In the liquid crystal display device according to (1), the first portion may be a plurality of ridge portions whose axis lines each extend along a traveling direction of the light and adjacent ones of which are arranged in parallel in a direction orthogonal to the light traveling direction, and the second portion may be a flat portion between the ridge portions adjacent to each other.

(3) In the liquid crystal display device according to (2), each of the ridge portions may be a cylindrical surface drawn by moving a straight line that is parallel to the axis line while maintaining a given direction.

BRIEF DESCRIPTION OF THE DRAWINGS

FIG. 2 is a perspective view showing a light guide plate.

DETAILED DESCRIPTION OF THE INVENTION

Figure 1:
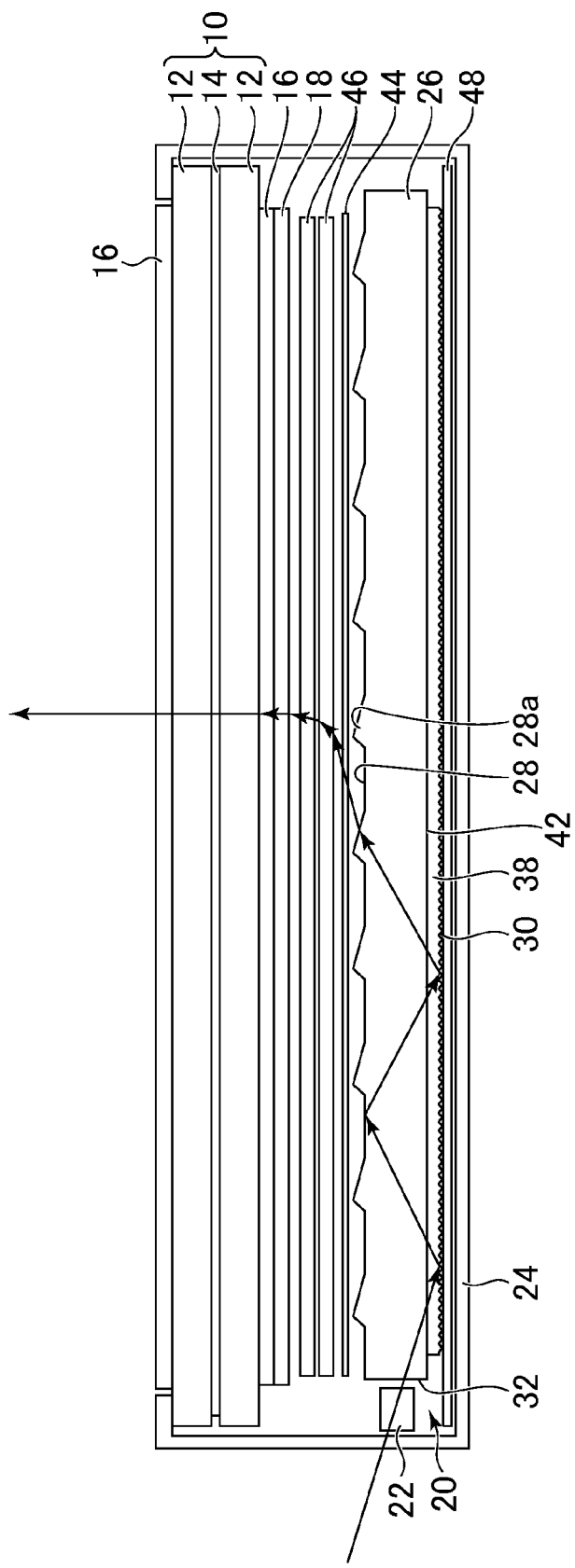
FIG. 1 is a cross-sectional view showing a liquid crystal display device according to an embodiment of the invention.

Hereinafter, an embodiment of the invention will be described with reference to the drawings. FIG. 1 is a cross-sectional view showing a liquid crystal display device according to the embodiment of the invention.

The liquid crystal display device includes a liquid crystal display panel 10. The liquid crystal display panel 10 includes a pair of substrates 12 formed of glass or the like, a liquid crystal layer 14 interposed between the substrates, and polarizers 16 respectively located on the outside of the pair of substrates 12. A film 18 for the conversion of polarized light is attached to the polarizer 16 on the lower side (on the side of a backlight 20 described later) to increase a light component including polarized light that vibrates in a light transmission axis direction of the polarizer 16.

The liquid crystal display device includes the backlight 20 used as a surface light source of the liquid crystal display panel 10. The backlight 20 includes a light source 22. The light source 22 is a point light source such as a light-emitting diode (LED). The light-emitting area of a point light source is narrow compared to a surface light source. The liquid crystal display device includes a frame 24. The backlight 20 is arranged inside the frame 24. The backlight 20 includes a light guide plate 26.

FIG. 2 is a perspective view showing the light guide plate 26 and the light source 22. The light guide plate 26 includes a front surface 28, a back surface 30 on the side opposite to the front surface 28, and an edge surface 32 connecting the front surface 28 with the back surface 30. The light source 22 faces the edge surface 32 of the light guide plate 26. The light source 22 shown in FIG. 2 is a component having a plurality of point light sources integrally arrayed. Light is incident from the light source 22 on the edge surface 32 of the light guide plate 26. The edge surface 32 of the light guide plate 26 that the light source 22 faces includes a flat surface 34 and a convex surface 36 projecting from the flat surface 34. In this example, the convex surface 36 is a convex curved surface. Light traveling from the light source 22 in a direction perpendicular to the flat surface 34 travels straight at the flat surface 34 while spreading out by refraction at the convex surface 36 and being incident on the light guide plate 26.

The light incident from the edge surface 32 is internally reflected and then surface-emitted from the front surface 28. The light exits in a planar manner from the front surface 28 of the light guide plate 26. The light guide plate 26 is used to convert the light of the light source 22 (point light source) into a surface light source to illuminate the liquid crystal display panel 10 with the surface light source. The front surface 28 of the light guide plate 26 faces the liquid crystal display panel 10 (refer to FIG. 1).

A plurality of convex portions 28a (transverse projecting portions) are formed on the front surface 28 of the light guide plate 26. The ridge line of the convex portion 28a continues across a traveling direction of the light. By forming the convex portions 28a, light reflected by the back surface 30 exits without returning from the front surface 28.

The back surface 30 of the light guide plate 26 includes a first portion 38. The first portion 38 is formed of a plurality of ridge portions 40. The axis line of each of the plurality of ridge portions 40 extends along the light traveling direction, and adjacent ones of the ridge portions are arranged in parallel in a direction orthogonal to the light traveling direction. A surface of the ridge portion 40 is a cylindrical surface drawn by moving a straight line that is parallel to the axis line while maintaining a given direction. By forming the ridge portions 40, spread of light that is reflected by the back surface 30 as an interface and returns to the inside is suppressed.

The surface of the first portion 38 is a rough surface. A surface of a mold that is used to form the light guide plate 26 by injection molding, the surface corresponding to the first portion 38, is subjected to blasting in which iron balls having a diameter of several micrometers are sprayed, so that the first portion 38 can be formed so as to have numerous small granular projections.

The back surface 30 of the light guide plate 26 includes second portions 42. The second portion 42 is a flat portion between the ridge portions 40 adjacent to each other. A surface of the second portion 42 is located at a position recessed relatively from the surface of the first portion 38. The surface of the second portion 42 is a smooth surface.

As shown in FIG. 1, a light diffusion sheet 44 is arranged above the light guide plate 26 (on the side close to the liquid crystal display panel 10). The light diffusion sheet 44 has a weak light diffusing effect. Therefore, when light transmits through the light diffusion sheet 44, an influence on a light distribution is reduced. Two prism sheets 46 are arranged above the light diffusion sheet 44 (on the side close to the liquid crystal display panel 10). When light transmits through the prism sheets 46, the light can be condensed to the front, making it possible to improve the front luminance.

The liquid crystal display device includes a reflective sheet 48 arranged so as to face the back surface 30 of the light guide plate 26. The reflective sheet 48 is arranged below the light guide plate 26 (on the side opposite to the display panel). The reflective sheet 48 is an enhanced specular reflector (ESR) reflective sheet. The ESR reflective sheet has a multi-layer film structure using a polyester-based resin, and has a high reflectance of about 98% in a visible light range. The ESR reflective sheet contributes to an improvement in luminance. However, a surface of the ESR reflective sheet is a smooth mirror surface, so that the ESR reflective sheet has high adhesion to the back surface 30 of the light guide plate 26 and is likely to adhere to the back surface.

In the embodiment, therefore, the reflective sheet 48 is in contact with the first portion 38 but avoids contact with the second portion 42. Since the surface of the first portion 38 with which the reflective sheet 48 is in contact is a rough surface, close contact between the light guide plate 26 and the reflective sheet 48 can be prevented to reduce a difference in chromaticity or a difference in luminance.

While there have been described what are at present considered to be certain embodiments of the invention, it will be understood that various modifications may be made thereto, and it is intended that the appended claims coverall such modifications as fall within the true spirit and scope of the invention.

What is claimed is:

1. A liquid crystal display device comprising:
a light source;
a light guide plate including a front surface, a back surface on the side opposite to the front surface, and an edge surface connecting the front surface with the back surface, the light guide plate being arranged such that the edge surface faces the light source, the light guide plate internally reflecting light incident from the edge surface and causing surface emission from the front surface;
a liquid crystal display panel arranged so as to face the front surface of the light guide plate; and
a reflective sheet arranged so as to face the back surface of the light guide plate, wherein
the back surface includes a first portion and a second portion, the second portion having a surface located at a position recessed relatively from a surface of the first portion,
the first portion is a plurality of ridge portions whose axis lines each extend along a traveling direction of light and adjacent ones of which are arranged in parallel in a direction orthogonal to the traveling direction of the light,
the second portion is a flat portion between the ridge portions adjacent to each other,
the surface of the first portion is a rough surface,
the surface of the second portion is a smooth surface,
the reflective sheet is in contact with the first portion but avoids contact with the second portion, and
the front surface of the light guide plate includes a transverse convex portion extending in a direction along the direction orthogonal to the traveling direction of the light.

2. The liquid crystal display device according to claim 1, wherein
each of the ridge portions is a cylindrical surface drawn by moving a straight line that is parallel to the axis line while maintaining a given direction.

3. The liquid crystal display device according to claim 1, wherein
the reflective sheet is an enhanced specular reflector film.

4. The liquid crystal display device according to claim 3, wherein
a surface of the enhanced specular reflector film is a smooth mirror surface.

5. The liquid crystal display device according to claim 1, wherein the light source is a component having a plurality of point light sources integrally arrayed.

6. The liquid crystal display device according to claim 1, wherein
the edge surface of the light guide plate includes a flat surface and a convex surface projecting from the flat surface.

7. The liquid crystal display device according to claim 6, wherein
the convex surface is a convex curved surface, and
light traveling from the light source in a direction perpendicular to the flat surface travels straight at the flat surface while spreading out by refraction at the convex surface and being incident on the light guide plate.

8. A liquid crystal display device comprising:
a light source;
a light guide plate including a front surface, a back surface facing the front surface, and an edge surface formed between the front surface and the back surface;
a liquid crystal display panel arranged so as to face the front surface of the light guide plate; and
a reflective sheet arranged so as to face the back surface of the light guide plate, wherein
the light source is arranged so as to face an incident surface as the edge surface,
light incident from the incident surface exits from the front surface,
the back surface includes cylindrical convex portions extending in a direction across the incident surface and a planar portion formed between adjacent two of the convex portions,
a surface of the convex portion includes a granular projection,
a surface of the planar portion is a smooth surface,
the reflective sheet is in contact with the convex portions and
the front surface of the light guide plate includes a transverse convex portion extending in a direction along the incident surface.

9. The liquid crystal display device according to claim 8, wherein
a cross-section of the convex portion parallel to the incident surface has an arc.

10. The liquid crystal display device according to claim 8, wherein
the reflective sheet is an enhanced specular reflector film.

11. The liquid crystal display device according to claim 8, wherein
a surface of the enhanced specular reflector film is a smooth mirror surface.

\* \* \* \* \*